United States Patent

[11] 3,604,974

[72] Inventors David W. Phillips;
George W. Van Cleave, both of Lexington, Ky.
[21] Appl. No. 882,953
[22] Filed Dec. 8, 1969
[45] Patented Sept. 14, 1971
[73] Assignee International Business Machines Corporation
Armonk, N.Y.

[54] APERIODIC LINEARITY CORRECTION CIRCUIT FOR CRT DEFLECTION
4 Claims, 4 Drawing Figs.

[52] U.S. Cl. .......... 315/27 GD, 315/27 TD
[51] Int. Cl. .......... H01j 29/56
[50] Field of Search .......... 315/27 R, 276 DC, 27 TD

[56] References Cited
UNITED STATES PATENTS
3,422,305 11/1969 Infante .......... 315/27 GD OTHER REFERENCES
IBM Technical Disclosure, " Pin Cushioning Correction Circuit," A. C. Koelsch, Vol. 5, #10, 3/63
IBM Technical Disclosure, " Pin Cushion Correction by Feedback," H. W. Johnson, Vol. 10, #10, 3/68

*Primary Examiner*—Rodney D. Bennett, Jr.
*Assistant Examiner*—J. M. Potenza
*Attorneys*—Hanifin and Jancin and John W. Girvin, Jr.

ABSTRACT: A linearity correction circuit for a cathode-ray tube incorporating a horizontal sweep generator which is responsive to a direct coupled, amplified, inverted and rectified version of its output signal, which when integrated by the horizontal sweep generator, causes a decrease in the amplitude of the horizontal sweep signal near the ends of the sweep where the nonlinearity is greatest. No reactive components are utilized in the feedback network enabling the circuit to be reset at any time during a sweep or held in the reset position for any length of time greater than the minimum recovery time of the sweep generator with no effect on the shape of the next sweep.

INVENTORS.
GEORGE W. VAN CLEAVE
DAVID W. PHILLIPS
BY John W Girvin, Jr.
ATTORNEY.

APERIODIC LINEARITY CORRECTION CIRCUIT FOR CRT DEFLECTION

CROSS-REFERENCE TO RELATED APPLICATION

The following application is assigned to the same assignee as the present application.

U.S. Pat. application, Ser. No. 782,285, filed Dec. 9, 1968, entitled "Automatic Data Composing, Editing and Formating System," Paul E. Goldsberry and Jack Ward Simpson, inventors

BRIEF BACKGROUND OF INVENTION

1. Field

This invention relates to a linearity correction circuit arrangement for use with an electromagnetic electron beam deflection system, and, more particularly, to a linearity correction circuit utilized with a cathode-ray tube having an aperiodic sweep rate.

2. Description of Prior

The present linearity correction circuit is designed for use in an output display system wherein the horizontal sweep rate is aperiodic and wherein the horizontal sweep may be terminated at any point in the sweep. In such an environment, it is mandatory that the horizontal sweep varies linearly with respect to time on each sweep so that there is no transient time necessary to reach a steady state operating condition. This must be accomplished with a minimum power loss and a minimum number of components.

The prior art linearity correction circuits utilized in conjunction with electromagnetic electron beam deflection display systems fall into three general categories. One type of linearity correction circuit utilizes an LC network which forms a resonant loop that is resonant at a frequency substantially equal to the horizontal deflection frequency. The current of this loop is mixed with a generated sawtooth current to provide a deflection current waveform which effects the desired linearity correction. It is necessary that this circuit operate periodically at this resonant frequency and the horizontal sweep therefore, must neither be truncated nor interrupted.

A second form of prior art device utilizes a linearity correction network wherein the sawtooth signal is applied to a nonreactive correction network, the output of which yields a S-shaped waveform to be applied to the deflection yoke. While such devices can be energized on an aperiodic basis, the correction network generally involves a great plurality of resistors and diode components necessitating large power losses. Additionally, it is necessary to precisely pick the resistive components in the network to insure the correct output waveform thereby adding to the expense of the circuit.

The third form of prior art device utilizes an integrator circuit which is coupled to the output of the sawtooth generator, the output of the integrator being coupled back to the input of the sawtooth generator to provide the S-shaped waveform. While the S-shaped waveform produced by the circuit adequately corrects for the nonlinearity of the tube while utilizing a minimum number of components, the circuit must be excited on a periodic basis. If the excitation input signal were aperiodic, the level change across the capacitor of the integrator would vary thereby affecting the output signal and causing it to be distorted.

SUMMARY OF THE INVENTION

In order to overcome the above problems of the prior art and to provide a linearity correction circuit for an electromagnetic deflection display system, the linearity correction circuit of the present invention incorporates a sweep generator and a nonreactive linearity feedback network coupled to the output of the sweep generator for providing a correction waveform input to the sweep generator. The utilization of a nonreactive feedback network enables it to be excited aperiodically and further enables the output of the horizontal sweep generator to be reset at any point in the sweep without affecting the generation of the next sweep.

The output signal of the ramp generator is combined with the inverted output signal of the ramp generator and a signal is thus generated which is proportional to the absolute value of the difference of the two combined signals. This signal is then coupled back to the input of the ramp generator and subtracted therefrom so that the resultant output signal is of S-shape. The resultant output signal is applied to the horizontal yoke driver circuit whereupon it is amplified and utilized to provide a control current to the deflection yoke windings of a cathode-ray tube. The S-shaped waveform of the current thus provided to the deflection yoke compensates for the nonlinearity introduced by the geometry of the cathode-ray tube and by the placement of the deflection yokes.

DESCRIPTION OF THE PREFERRED EMBODIMENT

Figures 1, 2:
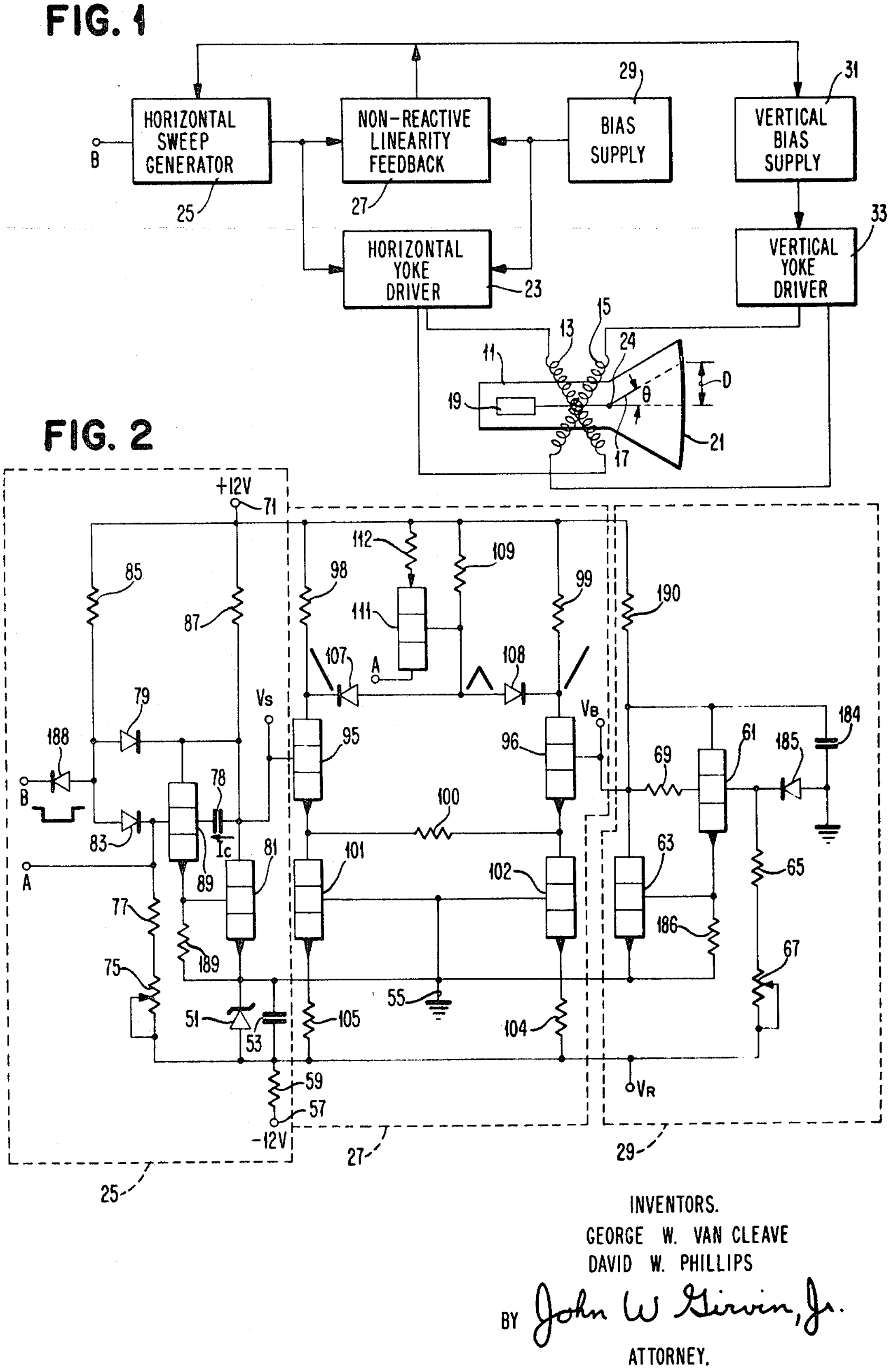
FIG. 1 is a block diagram of the deflection circuits which incorporate the nonreactive linearity feedback network of the present invention and which are required to position the electron beam of a cathode ray tube.
FIG. 2 is a circuit diagram illustrating a preferred embodiment of the horizontal sweep generator and the nonreactive linearity feedback network of the present invention.

Referring now to the drawings and more particularly to FIG. 1, thereof, a block diagram of the deflection circuits required to position the electron beam of a cathode-ray tube is depicted. The cathode-ray tube 11 has associated therewith magnetic horizontal and vertical deflection coils 13 and 15 which deflect an electron beam 17 as it travels from a beam source 19 to a screen or target 21. In order to effect horizontal deflection, the horizontal deflection coil 13 is positioned adjacent the neck of the tube 11 and normal to the axis thereof. The coil is would so that current from the horizontal yoke driver 25 will flow through the coil and produce a flux field that will be effective to deflect the electron beam 17 horizontally across the screen 21. When the beam strikes the fluorescent layer on the screen 21, a bright spot will be produced. This bright spot will be moved to the right or left of the center of the tube 11 by a displacement distance D.

Since a relatively flat screen 21 is utilized, the center of deflection 24 lies between the center of curvature of the screen and the screen 21 resulting in a nonlinear relationship between the angle of deflection, $\theta$, and the displacement distance D. The displacement D of the bright spot is a function of the tangent of the angle $\theta$ through which the beam is deflected. Thus, as the deflection angle $\theta$ increases, the change in deflection angle necessary to effect a constant incremental increase in the displacement distance D is reduced.

By carefully winding the magnetic horizontal deflection coil, it is possible to provide a yoke that will produce a very linear flux field. As a consequence, the deflection force which is exerted on the electron beam 17 will be very linear with respect to the deflection currents in the coil. Thus, as the deflection angle increases, the amount of current necessary to effect an incremental increase in the deflection distance D is reduced due to the tube geometry. Where the deflection circuit is utilized in conjunction with a cathode-ray tube having a relatively flat screen and/or a relatively large beam deflection angle, "S-shaping" of the deflection current waveform is required to compensate for the geometrical distortion and thereby produce a linear horizontal sweep on the screen.

The horizontal sweep generator 25 produces a ramp output signal which, due to feedback through the nonreactive linearity feedback network 27, has an S-shape. The bias supply 20 is utilized to center the sweep of the electron beam 17 with respect to the screen 21. Additionally, the output of the bias supply 29 is utilized by the nonreactive linearity feedback network to define the center of the ramp output of the horizontal sweep generator.

The output of the nonreactive linearity feedback network 27 is also utilized by the vertical bias supply 31 to compensate for "pin cushion" distortion introduced by the geometry of the cathode ray tube 11. The output of the vertical bias supply 31 provides an input signal to the vertical yoke driver 33 which in turn controls the vertical position of the electron beam 17 with respect to the screen 21.

Referring now to FIG. 2 of the drawings, a circuit diagram illustrating the preferred embodiment of the horizontal sweep generator 25, the nonreactive linearity feedback network 27 and the bias supply 29 is depicted.

The bias supply 29 is utilized to provide a constant bias voltage VB at terminal VB to the yoke driver circuits (not shown) and to the nonreactive feedback network 27. The constant voltage at terminal VB is maintained by a constant voltage VR at terminal VR and the constant voltage drops across the base to emitter junctions of two transistors as will be described. The constant voltage VR is maintained by the Zener diode 51 and the filter capacitor 53 at a constant value with respect to ground terminal 55. Current is supplied to the Zener diode from the minus 12 volt supply terminal 57 through resistor 59. The base electrode of the transistor 61 is maintained at a constant voltage above ground corresponding to the base to emitter drop across the transistor 61 and the base to emitter drop across the transistor 63.

Since the base electrode of transistor 61 is maintained at a constant voltage and since the terminal VR is maintained at a constant voltage, the current flowing through the resistor 65 and the variable resistor 67 is constant for a given setting of variable resistor 67. The current flowing through resistor 69 to the base electrode of transistor 61 remains constant even when there is a change in the plus 12 volt supply at terminal 71. This is because transistor 63 conducts more heavily or less heavily in accordance with any change in the plus 12 volt supply. Since the current through resistor 69 remains constant, the voltage at terminal VB remains constant.

The horizontal sweep generator 25 is constructed in a manner similar to that of the bias supply 29. Such similar construction keeps the ramp voltage output of the horizontal sweep generator 25 centered about the voltage level VB when environmental temperature changes and power supply changes are introduced as will be discussed hereinafter. Thus, for a given setting of the variable resistor 75, a constant current flows through resistor 77 and through the variable resistor 75 from the plus 12 volt supply terminal 71 to the anode terminal of the Zener diode 51. When the input signal at terminal B is positive and the capacitor 78 has been discharged to a level determined by the clamping diode 79, variations in the plus 12 volt supply effect current variations which flow through the clamping diode 79 and through the transistor 81 to ground.

When a negative signal is applied to terminal B, the diode 83 becomes back biased preventing current from flowing through the resistor 85 to the resistor 77 and the variable resistor 75. Instead, the constant current through the resistor 77 is provided from the plus 12 volt supply terminal 71 through the resistor 87 and the capacitor 78. The constant current through the capacitor 78 effects a ramp voltage output VS at terminal VS. The transistor 81 and the transistor 89 are connected in a Darlington arrangement to form a high gain amplifier with a constant current input signal and have the capacitor 78 coupled thereacross to provide the ramp output.

The constant voltage VB and the ramp voltage output VS are applied to the nonreactive linearity feedback network 27. This network consists of a differential amplifier formed by transistors 95 and 96, collector resistors 98 and 99 and emitter resistor 100. Additionally, the feedback network also includes two transistors 101 and 102 and two resistors 104 and 105 which form constant current sources for the differential amplifier. The nonreactive linearity feedback network 27 also includes a rectifier circuit formed by diodes 107 and 108 and resistor 109 and a voltage-to-current amplifier formed by transistor 111 and resistor 112.

The variable resistor 67 of the bias supply 29 is set so that the voltage at the terminal VB is equal to the center voltage level of the ramp voltage. This is equal to one-half the maximum swing of the ramp voltage supplied at terminal VS plus the DC component of the ramp voltage or $(VS_{min.} + VS_{max})/2$. Thus, when the ramp waveform is supplied to transistor 95, current first flows through diode 108 and transistor 96 and thereafter flows through diode 107 and transistor 95 from resistor 109. The current flow switches from diode 108 to diode 107 when the voltage at terminal VS equals the voltage at terminal VB or at the midpoint of the ramp signal. Thus, the voltage signal at the base electrode of transistor 111 increases to a peak and thereafter decreases at the same rate. This signal causes a current to flow in the collector electrode of the transistor 111 which is directly proportional to the voltage appearing across resistor 109.

Since the collector electrode of transistor 111 is directly tied to the base electrode of transistor 89 of the horizontal sweep generator 25, and since the current flowing through resistor 77 is constant, the current through capacitor 78 varies as a constant current minus the current flowing through transistor 111. Thus, instead of a constant amount of current being supplied through the capacitor 78, an amount of current which increases to a maximum at the center of the voltage ramp signal VS and thereafter decreases is supplied. This current causes the voltage which appears at terminal VS to have a maximum rate of change at the center of the ramp voltage signal and a minimum rate of change at the beginning and at the end of the ramp voltage signal. Thus, an S-shaped ramp voltage waveform is produced at terminal VS. The voltage waveform appearing at terminal VS is applied to the horizontal yoke driver as is the bias voltage VB.

Figure 3:
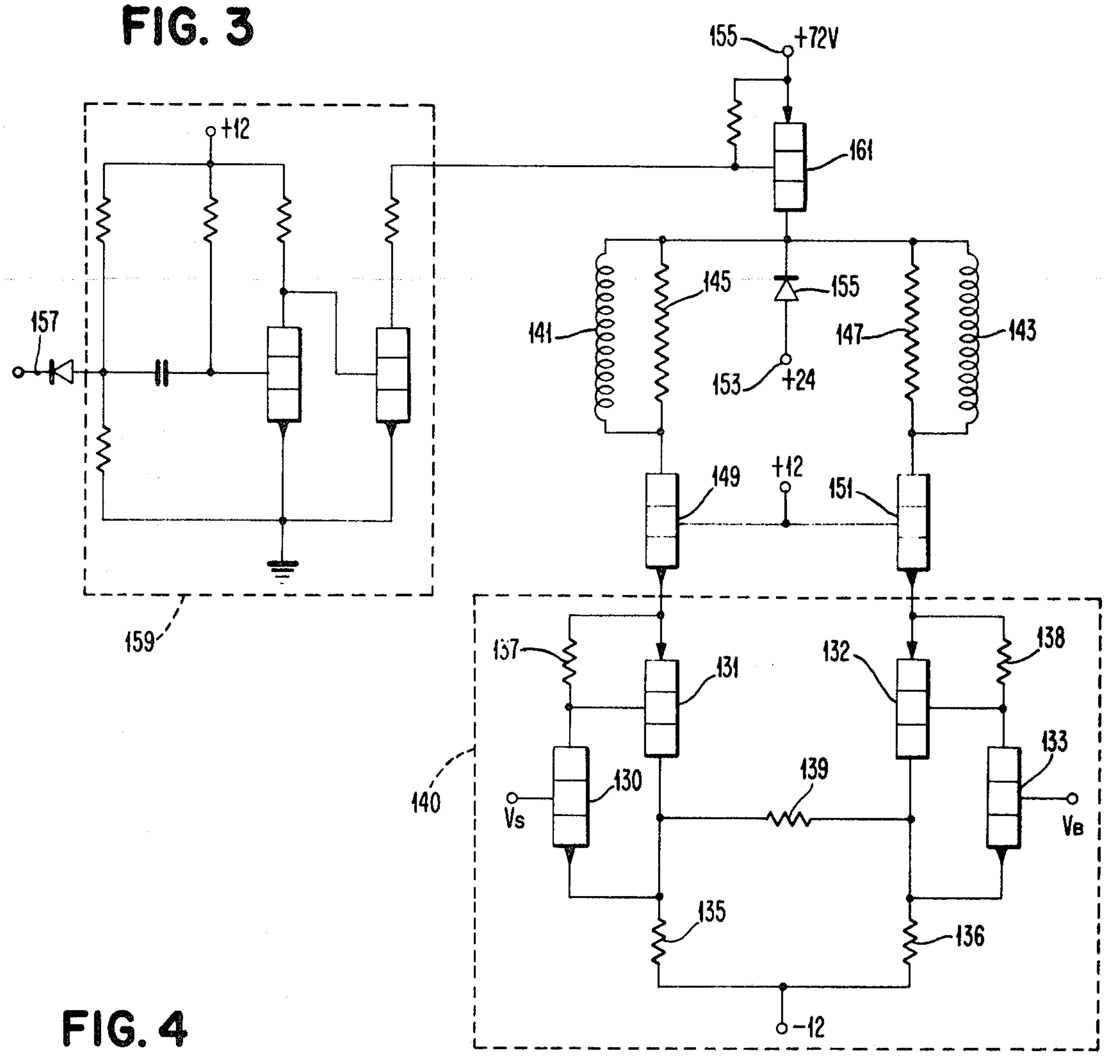
FIG. 3 is a circuit diagram of a horizontal yoke driver which can be utilized in conjunction with the horizontal sweep generator of the present invention.

Referring now to FIG. 3 of the drawings, the horizontal yoke driver circuit is depicted. Transistors 130, 131, 132, and 133 along with resistive components 135–139 form a high transconductance differential voltage-to-current amplifier 140. The amplifier is isolated from the yoke which is formed by the coils 141 and 143 and the damping resistors 145 and 147 by the common-base amplifier stages formed by transistors 149 and 151. The plus 24 volt supply at terminal 153 provides a current source to the coils. The diode 155 prevents current from flowing from the plus 72 volt supply at terminal 155 to the plus 24 volt supply at terminal 153 during retrace.

Figure 4:
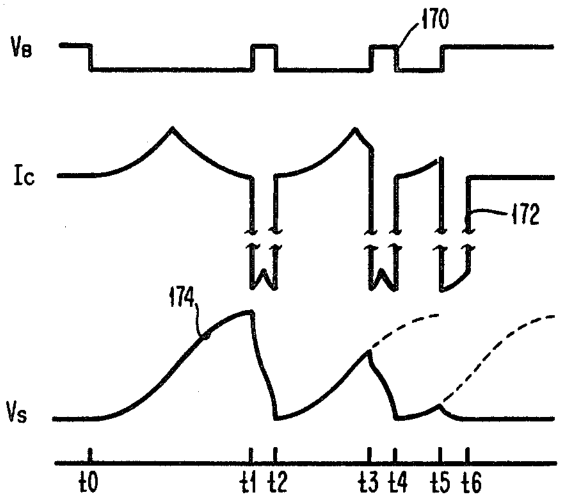
FIG. 4 depicts various waveforms of the circuit of FIG. 2.

Retrace is effected when a negative-going signal is applied to terminal 157 of the single-shot circuit 159 and when the signal at terminal B of FIG. 2 goes positive. This provides an output signal to the base electrode of transistor 161 causing that transistor to saturate. With the transistor 161 thus saturated, the plus 72 volt supply is coupled to the coils to provide the high voltage necessary for rapid retrace. The single-shot insures that the +72-volt source is applied only during the time required for retrace. Referring now to FIG. 4 of the drawing, a timing diagram of various waveforms of the circuit of FIG. 2 is depicted. The waveform 170 represents an aperiodic input signal applied to terminal B of the horizontal sweep generator 25 of FIG. 2, waveform 172 depict the current flowing through the capacitor 78 to the base of transistor 89 of the horizontal sweep generator 25 and waveform 174 depicts the voltage that appears at terminal VS of the horizontal sweep generator 25. When a negative going signal appears at terminal B of FIG. 2 at time TO as depicted by waveform 170, the horizontal sweep generator of FIG. 2 initiates the generation of a ramp output voltage signal as depicted by waveform 174. When the voltage waveform at terminal B goes positive as depicted at time T1, the horizontal sweep generator is reset. Thereafter, a negative going signal at time T2 of waveform 170 initiates a further horizontal sweep. The time interval between T0 and T1 represents the time interval necessitated to effect a complete horizontal sweep of the electron beam from the leftmost portion to the rightmost portion of the screen of the CRT device. The time interval between T1 and T2 represents the minimum time necessary for retrace after a complete trace.

The time interval between T2 and T3 is less than the time period necessary to effect a complete trace. This is because the waveform 170 is reset to the up level at time T3. Thus, resultant waveform 174 between time intervals T2 and T3 is a truncated version of the waveform between time intervals T0 and T1. Additionally, the sweep between time intervals T4 and T5 is also a truncated version of the waveform between T0 and T1. It should further be noted that the waveform 170 remains in an up level for a period of time longer than the minimum time interval necessary to effect retrace after time interval T6.

OPERATION

Referring once again to FIG. 1 of the drawings, when it is desirous to effect horizontal motion of the electron beam 17 with respect to the screen 21, an input signal is applied to the horizontal sweep generator 25 which causes the sweep generator to provide a ramp signal output to the horizontal yoke driver 23. The ramp signal output of the horizontal sweep generator 25 is also supplied to the nonreactive linearity feedback network 27 and fed back to the horizontal sweep generator 25 so that the ramp output is S-shaped This S-shaped voltage input signal to the horizontal yoke driver is converted into a current waveform which is applied to the horizontal deflection coil 13 to cause the electron beam originating at the source 19 to be uniformly deflected across the CRT screen. When this system is used in an environment such as that described in the aforereferenced copending application of Paul E. Goldsberry et al., the horizontal sweep of the electron beam 17 across the screen 21 may be terminated at any point in the sweep, the beam returned to its initial position and a further sweep initiated at any subsequent time thereafter. In this environment, it is necessary that the aperiodic operation of the sweep and its unpredictable truncation have no affect on the rate of the next subsequent sweep. This is accomplished by utilizing a linearity feedback network which incorporates no reactive components. This feedback network 27 is responsive to the output signal of the horizontal sweep generator 25 to provide a signal representative of the absolute value of the difference between the ramp signal output of the horizontal sweep generator and the voltage signal level at the center of the ramp signal. This difference signal is fed back as a correction signal to the horizontal sweep generator causing the ramp signal to be distorted and converted into an S-shaped voltage waveform. The center point of the ramp is defined by the bias supply 29. The output of the nonreactive linearity feedback network is also applied to the vertical bias supply 31 to correct for pin cushion distortion. The output signal of the vertical bias supply is provided to the vertical yoke driver 33 which effects vertical deflection of the electron beam 17.

Referring now to FIG. 2 of the drawings, a logic input signal such as that depicted by waveform 170 of FIG. 4 is applied to terminal B. This signal goes negative whenever it is desired to effect the generation of the horizontal sweep voltage and the signal goes positive whenever it is desired to reset the horizontal sweep to its initial position. When the signal goes negative, the diode 83 becomes back biased preventing a constant current from flowing from the plus 12 volt supply at terminal 71 through resistor 85, through resistor 77, and through variable resistor 75. Instead, the constant current component is supplied through resistor 87 and through capacitor 78 to resistor 77 and variable resistor 75 thereby effecting a ramp voltage signal at terminal VS. If the feedback signal at terminal A were removed, the output voltage signal at terminal VS would be a linear ramp signal. However, as will be described, the feedback provided at terminal A causes the output signal at terminal VS to be S-shaped.

The ramp signal output at terminal VS is applied to transistor 95 which, along with transistor 96, forms a differential amplifier. A constant voltage signal is applied to the base electrode of transistor 96 from terminal VB. This constant signal is provided by the bias supply 29 and is equal to the voltage level at the midpoint of the ramp swing. The voltage appearing at the collector of transistor 95 is an inverted ramp signal and the voltage signal appearing at the collector of the transistor 96 is a ramp signal. These signals are rectified by the diodes 107 and 108 so that a positive going signal followed by a negative going signal appears at the anodes of the diodes. This signal is representative of the absolute value of the difference between the ramp signal and the midpoint voltage level defined by the voltage at terminal VB. This voltage signal is then converted by transistor 111 to a current signal and applied through point A to the base electrode of transistor 89 of the ramp generator 25. The current signal thus provided is algebraically combined with the current flowing through resistor 77 and variable resistor 75. Thus, the feedback current is subtracted from the current which would normally flow through the capacitor 78. The minimum effect of the feedback current is at the midpoint of the ramp and the maximum effect of this current is at the end points in the ramp. This change in current flow through the capacitor 78 as depicted by waveform 172 of FIG. 4 effects an S-shaped voltage signal at terminal VS as depicted by waveform 174 of FIG. 4.

Referring now to FIG. 3 of the drawings, the S-shaped voltage waveform is applied to the base electrode of transistor 130 which, along with transistor 133, forms a differential amplifier. The output voltage signal of the bias supply, VB, is applied to the base electrode of transistor 133. The output signals of the differential amplifier are applied, after amplification, to the deflection coils 143 and 145 which are connected in push-pull fashion. These coils correspond to the magnetic horizontal deflection coil 13 of FIG. 1. The bias voltage VB is set varying the variable resistor 67 of FIG. 2 so that the electron beam 17 of FIG. 1 is centered horizontally at the midpoint of the ramp voltage signal.

The horizontal sweep generator 25 and the bias supply 29 are constructed in a similar manner. Thus, any change in environmental temperature or power supply voltage which affects the base-to-emitter voltage of transistors 81 and 89 also affects the base to emitter voltage of the transistors 61 and 63. Thus, shifts in the DC voltage level of the ramp signal track with shifts in the voltage level of the bias voltage insuring that the bias remains equal to the midpoint voltage level of the ramp when environmental temperature changes occur.

In a preferred embodiment, the following components were utilized:

Bias supply 29

| | |
|---|---|
| Transistor 61 and 63 | FTX-2N744 |
| Resistor 65 | 2.21K |
| Variable resistor 67 | 10K |
| Resistor 69 | 2K |
| Capacitor 184 | 6.8 microfarads |
| Diode 185 | 1N461 |
| Resistor 186 | 10K |

Horizontal Sweep Generator 25

| | |
|---|---|
| Resistor 75 | 6.81K |
| Variable resistor 77 | 20K |
| Capacitor 78 | 0.27 microfarad |
| Clamping diode 79 | 1N461 |
| Transistor 81 | 2N744 |
| Diode 83 | 1N461 |
| Resistor 85 | 680 |
| Resistor 87 | 510 |
| Transistor 89 | 2N744 |
| Diode 188 | 1N461 |
| Resistor 189 | 10K |

Nonreactive Linearity Feedback Network

| | |
|---|---|
| Transistors 95 and 96 | 2N744 |
| Collector Resistors 98 and 99 | 1.1K |
| Resistor 100 | 1.82K |
| Transistors 101 and 102 | 2N744 |
| Resistors 104 and 105 | 3.01K |
| Diodes 107 and 108 | 1N461 |
| Resistor 109 | 10K |
| Transistor 111 | 131 |
| Resistor 112 | 6.81K |
| Resistor 190 | 820 |
| Zener Diode 51 | 6.2 volt |
| Filtering Capacitor 53 | 6.8 microfarad |
| Terminal 57 | −12 volts |
| Resistor 59 | 470 |
| Terminal 71 | +12 volts |

It is, of course, recognized by those skilled in the art that several different circuit arrangements could be utilized to effect the functions of the nonreactive linearity feedback network 27 of the present invention. For example, the output signal of the horizontal sweep generator 25 could be inverted and applied to the base electrode of the transistor 96 of the differential amplifier portion of the nonreactive linearity feedback network 27. If the inverted signal were properly matched to the DC component of the ramp signal output at terminal VS, the same signal output would be produced at the anodes of the diodes 107 and 108. Additionally, various other circuits could be utilized to combine the ramp output with an inverted ramp output and which take the absolute value of the difference of these waveforms. This difference waveform is then fed back to a typical ramp generator to produce the desired S-shaped voltage waveform.

While this invention has been particularly shown and described with reference to a preferred embodiment thereof, it should be understood by those skilled in the art, that the foregoing and other changes in form and detail may be made therein without departing from the scope of the invention.

What is claimed is:

1. A deflection system for providing a linearity compensated deflection current to a deflection yoke of an electromagnetic electron beam deflection system comprising:

a voltage waveform generator comprising combination means for algebraically combining two input currents and an integrator circuit, said combination means being responsive to a constant current input signal and to a feedback current signal for algebraically combining said current signals and for providing a combined output current signal, said integrator being responsive to said combination means for integrating said combined output current signal and for providing an output compensated voltage signal representative of the integral of the combined output current signal;

defining means for defining the center voltage level of said output compensated voltage signal:

differencing means responsive to said defining means and to the output compensated voltage signal of said integrator circuit for providing a difference voltage signal proportional to the absolute value of the difference between said output compensated voltage signal and its center voltage level;

conversion means responsive to said difference voltage signal for converting said voltage signal to a feedback current signal directly proportional to said difference voltage signal, said feedback current signal being of opposite polarity than said input current signal;

means for coupling said feedback current signal from said conversion means to said combination means;

second conversion means responsive to said waveform generator for converting said output compensated voltage signal into said linearity compensated deflection current signal, said deflection current signal being directly proportional to said compensated voltage signal.

2. The deflection system set forth in claim 1 wherein said defining means comprises a constant voltage bias supply for providing a constant-voltage signal.

3. The deflection system set forth in claim 2 wherein said differencing means comprises a differential amplifier responsive to said output compensated voltage signal and to said constant voltage signal for providing a first signal proportional to said output compensated voltage signal and a second signal proportional to the inverse of said output compensated voltage signal at the differential output terminals of said differential amplifier, and a rectifier circuit comprising a pair of oppositely polarized diodes connected across said differential output terminals, the terminal of said diodes being joined to provide at the junction thereof said difference voltage signal.

4. The deflection system set forth in claim 3 wherein said conversion means comprises a transistor having base emitter and collector electrodes, said emitter electrode being connected through a resistor to a supply voltage, said base electrode being connected to the junction of said diodes, and said collector electrode being connected to said means for coupling said feedback current signal.